US008199533B2

(12) United States Patent
Shimada

(10) Patent No.: US 8,199,533 B2
(45) Date of Patent: Jun. 12, 2012

(54) SWITCHING POWER SUPPLY DEVICE

(75) Inventor: Masaaki Shimada, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 446 days.

(21) Appl. No.: 12/544,339

(22) Filed: Aug. 20, 2009

(65) Prior Publication Data

US 2010/0053998 A1     Mar. 4, 2010

(30) Foreign Application Priority Data

Aug. 26, 2008   (JP) ................................ 2008-216355

(51) Int. Cl.
*H02M 3/335* (2006.01)
*G05F 1/40* (2006.01)

(52) U.S. Cl. ................... 363/21.01; 363/21.18; 323/284

(58) Field of Classification Search .......... 323/282–285; 363/21.01, 21.07–21.11, 21.15–21.18
See application file for complete search history.

(56) References Cited

U.S. PATENT DOCUMENTS

| | | | | |
|---|---|---|---|---|
| 7,167,382 B2 * | 1/2007 | Hachiya | ........................... | 363/24 |
| 7,285,991 B2 * | 10/2007 | Yamashita | .................... | 327/108 |
| 7,304,464 B2 * | 12/2007 | Weng et al. | ................... | 323/285 |
| 7,492,615 B2 * | 2/2009 | Morota et al. | ............. | 363/21.16 |
| 7,545,657 B2 | 6/2009 | Shimada et al. | | |
| 2010/0020575 A1 * | 1/2010 | Shimada | ......................... | 363/49 |
| 2010/0039835 A1 * | 2/2010 | Shimada | .................... | 363/21.12 |

FOREIGN PATENT DOCUMENTS

CN     1547797 A     11/2004
JP     2007-215316     8/2007

OTHER PUBLICATIONS

U.S. Appl. No. 12/509,925, filed Jul. 27, 2009, Shimada.
Chinese Office Action mailed Mar. 1, 2012, issued for Chinese Application No. 200910167381.1 (with Partial English Translation).

* cited by examiner

*Primary Examiner* — Jessica Han
(74) *Attorney, Agent, or Firm* — Oblon, Spivak, McClelland, Maier & Neustadt, L.L.P.

(57) ABSTRACT

A switching power supply device includes: a transformer that has a primary winding and a secondary winding; a switching element connected to the primary winding of the transformer; a control circuit that controls the switching element to be turned on/off in a case where a voltage is inputted to the primary winding of the transformer, and thereby induces a voltage in the secondary winding of the transformer; and a rectifying/smoothing circuit that rectifies and smoothes the voltage induced in the secondary winding of the transformer, and outputs the rectified and smoothed voltage to a load. The control circuit has: a current control unit that controls the switching element to prevent a current flowing through the switching element from being lowered to a fixed value or less in a case where the load is light; and an intermittent control unit that, in the case where the load is light, controls the switching element to perform an intermittent oscillation operation based on a feedback signal corresponding to an output voltage to the load.

4 Claims, 13 Drawing Sheets

DRAIN VOLTAGE
100V/DIV

DRAIN CURRENT
0.5A/DIV
2ms/DIV

DRAIN VOLTAGE
100V/DIV

DRAIN CURRENT
0.5A/DIV
2μs/DIV

SWITCHING POWER SUPPLY DEVICE

BACKGROUND OF THE INVENTION

1. Field of the Invention

The present invention relates to a switching power supply device that generates and outputs a predetermined voltage by a switching operation, and is capable of a stable control at a time when a load is light.

2. Description of the Related Art

A switching power supply device that controls an output voltage by performing an ON/OFF control for a switching element has been heretofore used for OA equipment, consumer appliances and the like. In recent years, efficiency enhancement of the switching power supply device has been required from viewpoints of considering the environment and saving energy. A control circuit that controls the switching element in the switching power supply device is usually composed of a one-chip integrated circuit, and includes, in an inside of the integrated circuit, a starting circuit for starting the integrated circuit concerned.

A conventional quasi-resonant switching power supply device shown in FIG. 1 includes: an alternating current power supply 1; abridge rectifier 2; a capacitor 3 for a normal filter; a transformer 4; a switching element 5; a rectifying diode 6; an output capacitor 7, an error amplifier 8; a light emitting diode (LED) 9a and phototransistor 9b of a photocoupler; capacitors 10 and 14; a diode 11; a backup capacitor 12; a resistor 13; a resonance capacitor 15; and a control unit 50 for controlling the switching element 5.

The transformer 4 has a primary winding P, a secondary winding S and an auxiliary winding D, and transmits energy from a primary-side circuit of the switching power supply device to a secondary-side circuit thereof. Moreover, the switching element 5 is connected to the primary winding P of the transformer 4. The auxiliary winding D, the diode 11 and the backup capacitor 12 compose an auxiliary power supply circuit.

Moreover, the switching element 5, the resonance capacitor 15 and the control unit 50 are provided, for example, in a one-chip semiconductor device. Then, the semiconductor device includes: as external terminals, an input terminal of the switching element 5 (Drain terminal); an output terminal of the switching element 5 (Source terminal); an input terminal of the auxiliary power supply circuit (Vcc terminal); a feedback signal input terminal (FB terminal); an overcurrent protection terminal (OCP terminal); a zero current detection terminal (ZCD terminal); and a ground terminal of the control unit 50 (GND terminal). Note that the control unit 50 includes: a StartUp terminal connected to the Drain terminal; the Vcc terminal; the FB terminal; the GND terminal; the OCP terminal; the ZCD terminal; and a DRV terminal for outputting a control signal to the switching element 5.

The error amplifier 8 is connected between a power supply output terminal Vout and a ground terminal Gnd of the secondary-side circuit, and controls a current flowing through the LED 9a of the photocoupler in response to a difference between an output voltage Vout and an internal reference voltage of the error amplifier 8 concerned. A resistor is connected in parallel to the LED 9a of the photocoupler, and the LED 9a gives feedback of an error with respect to the reference voltage of the secondary-side circuit to the primary-side circuit. Moreover, the phototransistor 9b of the photocoupler operates in response to light of the LED 9a of the photocoupler. A collector of the phototransistor 9b of the photocoupler is connected to the FB terminal of the control unit 50, and an emitter thereof is grounded. With this configuration, the phototransistor 9b of the photocoupler outputs a feedback signal to FB terminal of the control unit 50. Therefore, the switching power supply device can supply power corresponding to variations of a load.

As described above, the auxiliary power supply circuit is composed by connecting the diode 11 and the backup capacitor 12 to the auxiliary winding D. Moreover, the auxiliary power supply circuit rectifies and smoothes a voltage induced in the auxiliary winding D, and charges the backup capacitor 12 owned thereby to then supply power to the Vcc terminal of the control unit 50. Moreover, the voltage induced in the auxiliary winding D is inputted to the ZCD terminal of the control unit 50 thorough the resistor 13 without being rectified or smoothed.

A voltage induced in the secondary winding S during an OFF period of the switching element 5 is rectified and smoothed by the rectifying diode 6 and the output capacitor 7, and is outputted as an output voltage of the secondary-side circuit from such a Vout terminal to the load.

Moreover, the primary-side circuit includes an LC resonance circuit composed of inductance of the primary winding P of the transformer 4, and capacitance of the resonance capacitor 15 connected in parallel to the switching element 5. It is also possible to compose the resonance capacitor 15 only of parasitic capacitance of the switching element 5. Although the resonance capacitor 15 is connected in parallel to the switching element 5, the resonance capacitor 15 exerts the same effect even in the case of being attached in parallel to the primary winding P.

The control unit 50 outputs the control signal from the DRV terminal, thereby drives a gate of the switching element 5 to turn on/off the switching element 5, and generates a direct current voltage, which is smoothed on the secondary winding S side of the transformer 4, between the power supply output terminal Vout and the ground terminal Gnd. Specifically, the transformer 4 generates counter electromotive force by a drain current flowing therethrough during an ON period of the switching element 5. As a result, a current flows through the secondary winding S side, and energy is stored in the transformer 4. Thereafter, the switching element 5 is turned off; however, the energy stored in the transformer 5 flows a current to the output capacitor 7 through the rectifying diode 6 on the secondary winding S side of the transformer 4 during an OFF period of the switching element 5. In such a way, the direct current voltage smoothed on the secondary winding S side of the transformer 4 is generated between the power supply output terminal Vout and the ground terminal Gnd.

When discharge of the energy, which is stored in the transformer 4, to such a smoothing circuit on the secondary winding S side is ended, the current flowing through the rectifying diode 6 becomes zero. As a result, a voltage between source and drain terminals of the switching element 5 drops. Then, oscillations start in the LC resonance circuit of the transformer 4. At this time, in the auxiliary winding D of the transformer 4, a voltage corresponding to a drain voltage with an amplitude proportional to the number of turns thereof is generated. The drain voltage of the switching element 5 oscillates while taking, as a center, a direct current voltage generated between terminals of the smoothing capacitor 3 when an alternating current input from the alternating current power supply 1 is rectified. As opposed to this, since the input terminal ZCD for detecting the zero current is connected to the auxiliary winding D of which polarity is reversed from that of the primary winding P of the transformer 4, a zero current detection signal with an oscillation waveform in which 0 V is taken as a center is inputted to the imputer terminal ZCD concerned. In such a way, the control unit 50 outputs a signal of an H level to the gate terminal of the switching element 5, and turns on the switching element 5 again.

Here, in the case where the load (not shown) connected between the Vout terminal and the Gnd terminal is in a light load state where impedance is high, an ON width of the control signal for the switching element 5 is narrowed. Hence, the ON period of the switching element 5 is short, and the maximum value of the drain current thereof is low. Therefore, the energy stored in the transformer 4 is small, and resetting of the transformer 4 is ended in a relatively short period. Hence, a period while a value of the voltage between the drain and source terminals of the switching element 5 is high is shortened, and the current flowing through the rectifying diode 6 connected to the secondary winding S of the transformer 4 becomes zero in a short period.

Meanwhile, in the case where the load connected between the Vout terminal and the Gnd terminal is in a heavy load state where the impedance is low, the ON width of the control signal outputted by the control unit 50 is widened. Hence, the ON period of the switching element 5 is lengthened, and the maximum value of the drain current thereof rises. Therefore, the energy stored in the transformer 4 is increased, and a resetting period of the transformer 4 is lengthened. Hence, the period while the value of the voltage between the drain and source terminals of the switching element 5 is high is lengthened, and the current flowing through the rectifying diode 6 connected to the secondary winding S of the transformer 4 continues to flow therethrough during a relatively long period.

Moreover, as shown in FIG. 2, the control unit 50 of the conventional quasi-resonant switching power supply device includes, in an inside thereof, an internal power supply 51, an inverter 52, a hysteresis comparator 54, a flip-flop 56, a starting circuit 57, a constant current source 60, a transistor 61, an FB comparator 62, an OCP comparator 63, an OR gate 64, an AND gate 65, an oscillator 66, a second inverter 67, first and second drive circuits 68 and 69, first and second driving switching elements 70 and 71, a BD comparator 84, a bottom detection unit 85, and a second OR gate 86.

The internal power supply 51 starts the control unit 50 based on power supplied from the Vcc terminal, and supplies, to the entirety of the control unit 50, power necessary for operations thereof. Moreover, the internal power supply 51 detects an output of the hysteresis comparator 54, and operates in the case where the output of the hysteresis comparator 54 is a signal of the high (H) level, but stops operating and stops the supply of the power to the entirety of the control unit 50 in the case where the output is a low (L) level.

The hysteresis comparator 54 outputs the signal of the H level in the case where a voltage of the Vcc terminal is 16.5 V as a starting voltage value or more. Thereafter, when the voltage of the Vcc terminal drops to 10 V as the lowest operation voltage value or less, the hysteresis comparator 54 outputs the signal of the L level.

The inverter 52 inverts the output of the hysteresis comparator 54, and outputs the inverted output to a switch 81 in the starting circuit 57 to be described later.

The starting circuit 57 is composed of a constant current source 80 and a switch 81, and flows therethrough a starting current in order to supply the power to the internal power supply 51. Here, an input terminal of the constant current source 80 is connected to the StartUp terminal, and receives the supply of the power from the external Drain terminal. In the case where the switch 81 is turned on, the starting circuit 57 supplies the current, which is generated by the constant current source 80, through the Vcc terminal to the backup capacitor 12 of the auxiliary power supply circuit 30, and charges the backup capacitor 12. Moreover, the switch 81 in the starting circuit 57 switches on in the case where the output of the inverter 52 is the signal of the H level, and switches off in the case where the output of the inverter 52 is the signal of the L level. Hence, the starting circuit 57 turns on the switch 81 and supplies the starting current to the control unit 50 in the case where the voltage of the Vcc terminal drops to 10 V or less and it is necessary to restart the control unit 50.

The constant current source 60 generates a feedback voltage, which comes from the secondary-side circuit, at the FB terminal by the phototransistor 9b of the photocoupler and the capacitor 10, which are connected to the FB terminal on the outside of the control unit 50.

In the transistor 61, a base thereof is connected to the FB terminal. Then, the transistor 61 turns on in response to the feedback voltage of the FB terminal, and an emitter current flows therethrough.

The OCP terminal is connected to the Source terminal on the outside of the control unit 50. A voltage corresponding to an amount of a current flowing through the switching element 5 is applied to the OCP terminal, and the OCP terminal outputs a voltage signal to the FB comparator 62 and the OCP comparator 63.

The FB comparator 62 outputs an H signal in the case where the voltage signal outputted from the OCP terminal exceeds a voltage signal corresponding to the amount of the current flowing through the transistor 61. In such a way, when a voltage value of the voltage signal outputted form the OCP terminal exceeds a voltage value corresponding to a feedback amount from the secondary-side circuit, which is shown on the FB terminal, the FB comparator 62 outputs the signal of the H level to an R terminal of the flip-flop 56 through the OR gate 64. As a result, the switching element 5 is turned off, and an output voltage value of the secondary-side circuit is constantly controlled.

In the case where the voltage signal inputted to the OCP terminal exceeds a predetermined voltage value, the OCP comparator 63 determines that the amount of the current flowing through the switching element 5 is an overcurrent, and outputs an H signal. Then, this signal of the H level is inputted through the OR gate 64 to the R terminal of the flip-flop 56.

In the case where at least one of the FB comparator 62 and the OCP comparator 63 outputs an H signal to the OR gate 64, the OR gate 64 outputs an H signal to the R terminal of the flip-flop 56.

The oscillator 66 generates a maximum duty cycle signal that decides a maximum duty cycle of the switching element 5, and then outputs the maximum duty cycle signal to the AND gate 65. Moreover, the oscillator 66 generates a clock signal that decides an oscillation frequency of the switching element 5. This clock signal is outputted to an S terminal of the flip-flop circuit 56 through the second OR gate 86. In such a way, the oscillator 66 restricts the ON width of the switching element 5 when the load is excessive, and thereby can prevent the overcurrent from flowing therethrough.

The flip-flop 56 outputs a control signal from an output terminal (Q terminal) thereof based on the clock signal inputted to the S terminal and on the signal inputted to the R terminal. The Q terminal of the flip-flop 56 is connected to an input terminal of the AND gate 65. Moreover, an output terminal of the AND gate 65 is connected to the first and second drive circuits 68 and 69 through the second inverter 67. The first drive circuit 68 is connected to a gate terminal of the first driving switching element 70 made of a P-type MOSFET. Moreover, the second drive circuit 69 is connected to a gate terminal of the second driving switching element 71 made of an N-type MOSFET. The first and second driving switching elements 70 and 71 are driven alternately in response to an output of the AND gate 65, whereby the switching element 5 is controlled to be turned on/off.

As mentioned above, the BD comparator 84 compares, with a predetermined value, a voltage value of the zero current detection signal with the oscillation waveform in which 0 V is taken as the center, and outputs a comparison result to the bottom detection unit 85.

The bottom detection unit 85 performs zero cross detection for the zero current detection signal, which is applied to the input terminal ZCD, based on the output of the BD comparator 84. Then, the bottom detection unit 85 outputs a signal of the H level to the S terminal of the flip-flop 56 through the second OR gate 86 at timing when the drain voltage of the switching element 5 becomes the lowest voltage (bottom). In such a way, a switching operation in a state where the current flowing through the transformer 4 is zero, that is, soft switching can be realized.

In the case where at least one of the oscillator 66 and the bottom detection circuit 85 outputs the H signal, the second OR gate 86 outputs the H signal to the S terminal of the flip-flop 56.

Next, a description will be made of operations of the conventional switching power supply device. First, a sinusoidal voltage outputted by the alternating current power supply 1 is rectified by the bridge rectifier 2, passes through the capacitor 3, and is inputted to the Drain terminal of the switching element 5 through the primary winding P of the transformer 4. Meanwhile, since the switch 81 is turned on, the starting circuit 57 supplies a current of the constant current source 80 to the backup capacitor 12 of the auxiliary power supply circuit and charges the backup capacitor 12 until the voltage of the Vcc terminal exceeds 16.5 V. When the voltage of the Vcc terminal exceeds 16.5 V, and the internal power supply 51 starts to operate and starts to supply the power to the control unit 50, then the starting circuit 57 turns off the switch 81, and stops supplying the starting current.

When the voltage of the Vcc terminal exceeds 16.5 V, and the operations of the control unit 50 are started, then the switching element 5 starts a switching operation. Therefore, the energy starts to be supplied to the respective windings of the transformer 4, and currents flow through the secondary winding S and the auxiliary winding D.

The alternating current flowing through the secondary winding S is rectified and smoothed by a rectifying/smoothing circuit composed of the rectifying diode 6 and the output capacitor 7, and thereby becomes a direct current. Then, this direct current is outputted from the Vout terminal to the external load.

Thereafter, the switching operation of the switching element 5 is repeated, whereby the output voltage of the Vout terminal gradually rises. Then, when the output voltage of the Vout terminal reaches the reference voltage set in the error amplifier 8, the current flowing through the LED 9a of the photocoupler is increased. Then, a current flowing through the phototransistor 9b of the photocoupler is increased. As a result, the capacitor 10 is discharged, and the voltage of the FB terminal drops. In such a way, the control unit 50 controls the switching element 5 to stabilize the output voltage of the Vout terminal. During a period while the switching operation of the switching element 5 is being stopped, a voltage VFB of the FB terminal rises in such a manner that a current generated by the constant current source 60 charges the capacitor 10.

The alternating current flowing through the auxiliary winding D is rectified and smoothed by the diode 11 and the backup capacitor 12, is fully used as an auxiliary power supply of the control unit 50, and supplies the power to the Vcc terminal. As mentioned above, when the Vcc terminal reaches the starting voltage (16.5 V) once, the switch 81 in the starting circuit 57 is turned off. Therefore, the supply of the power to the Vcc terminal after the start of the control unit 50 is performed by the auxiliary power supply circuit. A polarity of the auxiliary winding D is the same as that of the secondary winding S, and accordingly, the voltage of the Vcc terminal becomes proportional to the output voltage of the Vout terminal.

When the load connected to the Vout terminal becomes light, the current flowing through the LED 9a of the photocoupler is increased in response to the error of the Vout voltage with respect to the reference voltage set in the error amplifier 8. Then, the current flowing through the phototransistor 9b of the photocoupler is increased. As a result, the capacitor 10 is discharged, and the voltage of the FB terminal drops. In such a way, the flip-flop 56 is reset, and the control unit 50 controls the switching element 5 to shorten an ON time (ON width).

Moreover, as mentioned above, if the ON time of the switching element 5 is controlled to be shortened at the time when the load is light, then the maximum value of the drain current thereof is lowered, and accordingly, the energy stored in the transformer 4 is also decreased. Therefore, the resetting of the transformer 4 is ended in a relatively short period. Hence, the period while the value of the voltage between the drain and source terminals of the switching element 5 is high is shortened, and the current flowing through the rectifying diode 6 connected to the secondary winding S of the transformer 4 becomes zero in a short period. Thereafter, the flip-flop 56 is set by the bottom detection unit 85, and accordingly, an OFF time of the switching element 5 is also shortened in a similar way to the ON time thereof. Therefore, the frequency of the switching element 5 rises.

While the voltage of the FB terminal is dropping and the oscillation of the switching element 5 is being stopped, the current flowing through the LED 9a of the photocoupler is decreased. Then, following such a decrease, the current flowing through the phototransistor 9b of the photocoupler is decreased. In such a way, the capacitor 10 is charged by the constant current source 60, and the voltage of the FB terminal rises. The switching power supply device repeats the above-described operations, and when the load is light, controls the voltage by raising the switching frequency of the switching element 5.

FIG. 3 is a waveform chart of the respective portions of the conventional quasi-resonant switching power supply device when the load is light. As shown in FIG. 3, the control unit 50 outputs the high-frequency control signal from the DRV terminal. Therefore, the switching frequency of the switching element 5 rises, and the maximum value of a current Ids between the drain and source terminals becomes a small value. Moreover, FIG. 4 is a switching operation waveform chart of the quasi-resonant switching power supply device shown in FIG. 1 when the load is none. As shown in FIG. 4, the switching element 5 performs the switching operation at a frequency as high as approximately 250 kHz when the load is none.

If an electronic instrument or the like connected to the Vout terminal is in a standby state, then an output load connected to an output terminal of the power supply becomes light. Therefore, the power to be supplied to the load is saved to be small in comparison with a usual operation state. However, at the time when the load is light, the switching frequency rises significantly as mentioned above. Therefore, a switching loss in the switching element 5 is increased, and in addition, there occur problems of damage to the switching element 5 owing to heat generation thereby, and of noise regulations in a frequency band concerned therewith. In this connection, a switching power supply has been proposed, which suppresses the rise of the frequency by defining an upper limit of the maximum switching frequency.

In Patent Publication 1, a switching power supply control circuit that improves power efficiency is disclosed. This switching power supply control circuit includes: signal generation means for generating a switching command signal for a switching element; oscillation means for oscillating a fixed cycle that defines an upper limit frequency at the time of turning on the switching element by the switching command signal; counting means for counting the number of times that the switching element is turned on so as to stop the switching command signal when the switching element is turned on a present N number of times in the case where the switching element is continuously turned on by the switching command signal. Then, in the case where the load is light, the switching element performs an intermittent operation, in which the switching element turns on continuously the number of N times, and is then paused.

Hence, in accordance with this switching power supply control circuit, the intermittent operation is performed a predetermined number of times by using a timer circuit as the oscillation means and a pulse counter circuit as the counting means, whereby the power efficiency can be improved. Moreover, the number N of continuous switching times is set at an appropriate number of times in response to a usage purpose of the switching power supply, whereby the switching power supply can be set into the optimum switching operation state with regard to suppression of a ripple and efficiency enhancement when the load is light, which are settled in a tradeoff relationship in a partial resonance power supply.

[Patent Publication 1] Japanese Patent Laid-Open Publication No. 2007-215316

SUMMARY OF THE INVENTION

In recent years, from a viewpoint of saving the energy, the switching power supply has been required to improve the efficiency/lower power consumption at a standby time, and contrivance to reduce the switching loss at the standby time has been required to be made for the switching power supply. As mentioned above, the switching power supply control circuit described in Patent Publication 1 repeats such a cycle, in which the switching operation is executed the predetermined number of times and is thereafter stopped, in the case where the FB terminal voltage drops to a fixed value or less, and thereby performs the intermittent operation. Therefore, the switching power supply control circuit of Patent Publication 1 will always perform the predetermined intermittent operation no matter whether the load may be light or heavy, and has difficulty performing a more precise output control. Moreover, in the quasi-resonant switching power supply device shown in FIG. 1, the frequency rises and the output drops when the load is light, and accordingly, an abrupt change of the FB terminal voltage is less likely to occur. Therefore, it is difficult to determine whether the load is light or heavy based on the FB terminal voltage.

This described phenomenon occurs in a similar way also in the case where the rise of the switching frequency is suppressed by bottom skipping as in the switching power supply control circuit described in Patent Publication 1 since an OFF time duty is only increased. Moreover, the pulse counter circuit and the timer circuit are required, and it is necessary to set the number of switching times. Accordingly, much cost and labor have been required, and in addition, the device is increased in scale.

The present invention has been made in order to solve the above-mentioned problems inherent in the related art. It is an object of the present invention to provide a highly efficient switching power supply device that reduces, by means of a simple configuration, the switching loss when the load is light.

In order to solve the above-described problems, a switching power supply device according to a first aspect of the present invention includes: a transformer that has a primary winding and a secondary winding; a switching element connected to the primary winding of the transformer; a control circuit that controls the switching element to be turned on/off in a case where a voltage is inputted to the primary winding of the transformer, and thereby induces a voltage in the secondary winding of the transformer; and a rectifying/smoothing circuit that rectifies and smoothes the voltage induced in the secondary winding of the transformer, and outputs the rectified and smoothed voltage to a load. The control circuit has: a current control unit that controls the switching element to prevent a current flowing through the switching element from being lowered to a fixed value or less in a case where the load is light; and an intermittent control unit that, in the case where the load is light, controls the switching element to perform an intermittent oscillation operation based on a feedback signal corresponding to an output voltage to the load.

In accordance with the first aspect of the present invention, the highly efficient switching power supply device can be provided, which reduces, by means of the simple configuration, the switching loss when the load is light.

DETAILED DESCRIPTION OF THE EMBODIMENTS

A description will be made below in detail of embodiments of a switching power supply device of the present invention based on the drawings.

Embodiment 1

Figure 1:
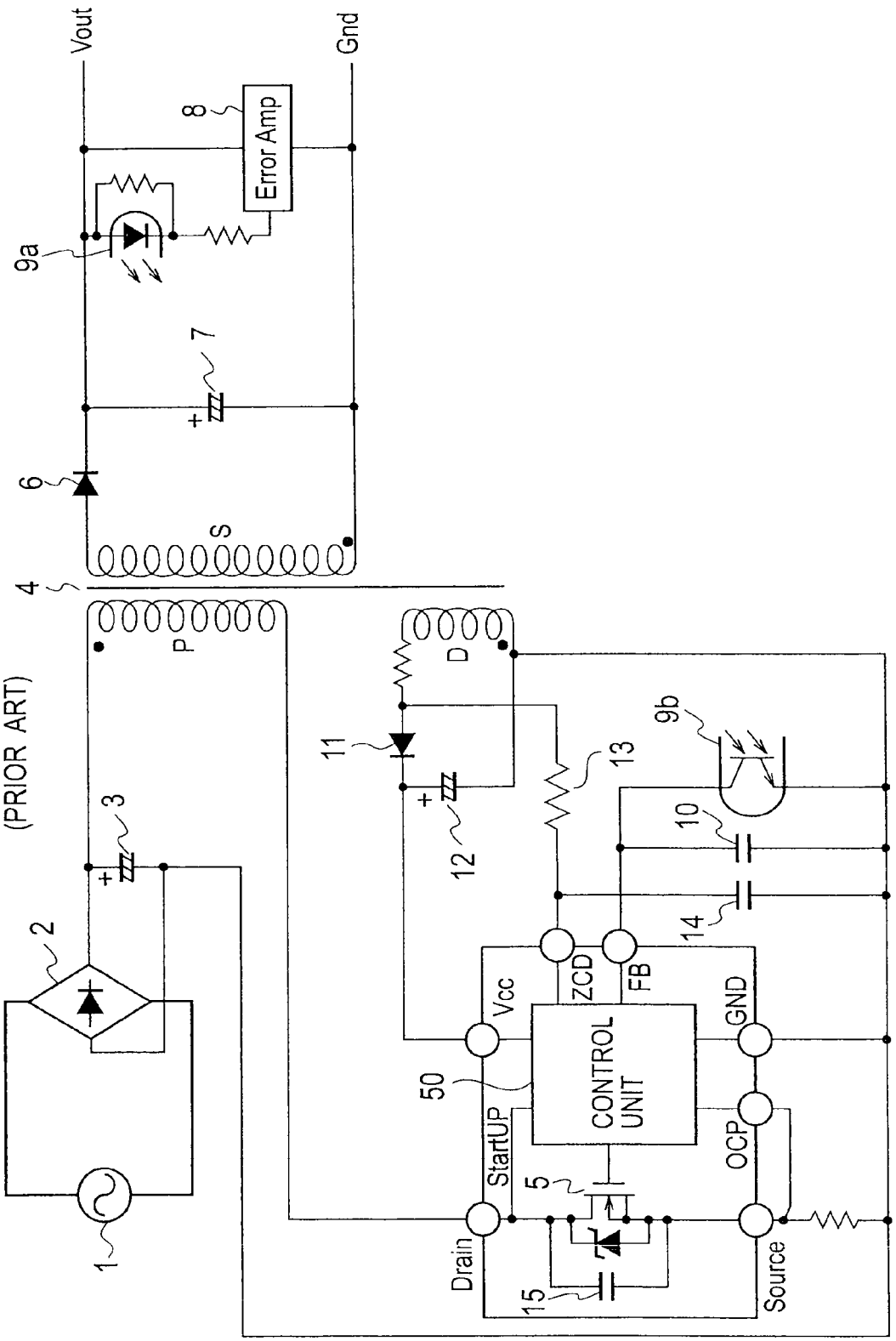
FIG. 1 is a circuit diagram showing a configuration of a conventional quasi-resonant switching power supply device.
Figure 5:
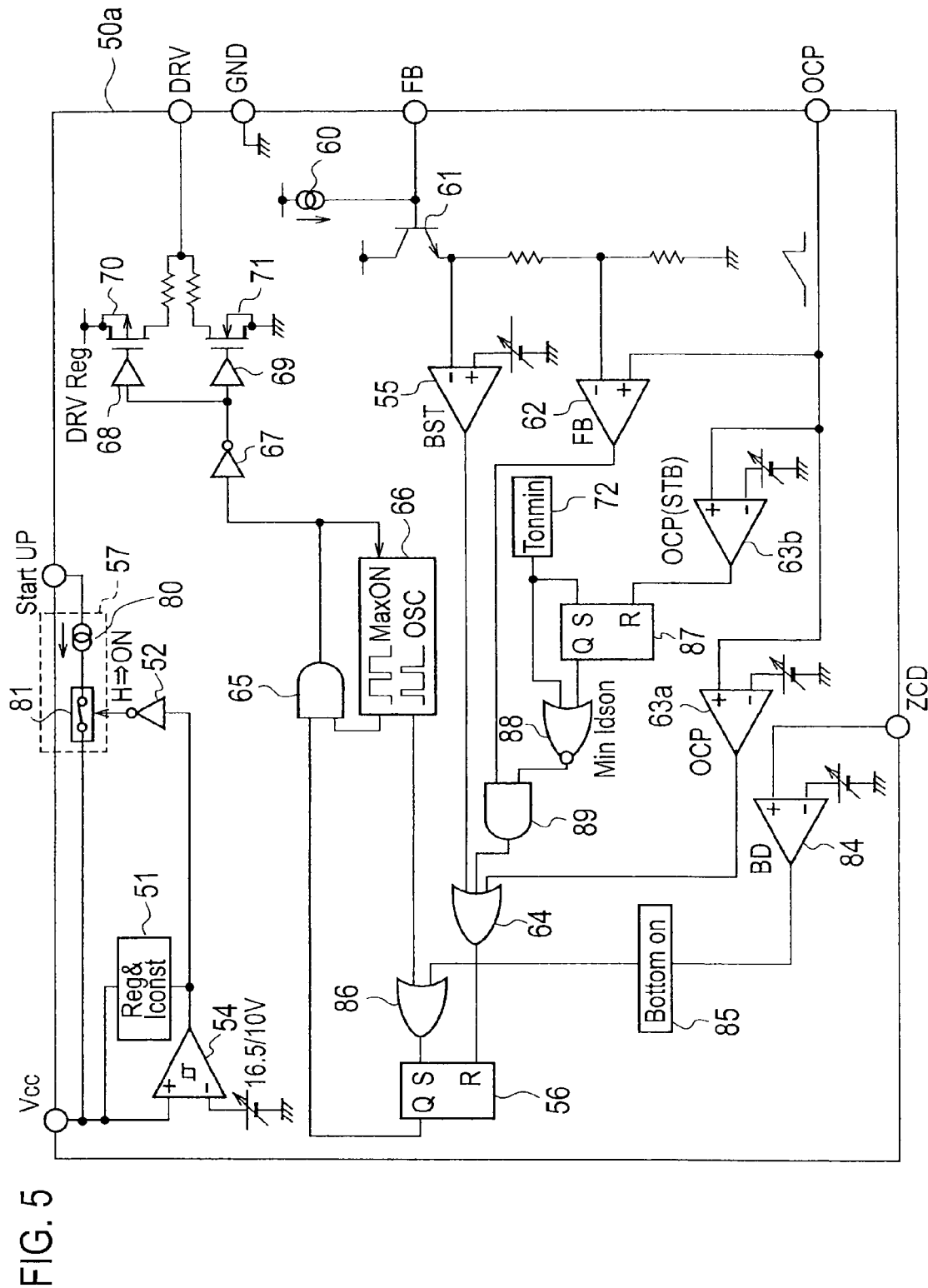
FIG. 5 is a circuit diagram showing a configuration of a control unit of a switching power supply device according to Embodiment 1 of the present invention.

An entire configuration of a switching power supply device according to Embodiment 1 of the present invention is substantially similar to that of the quasi-resonant switching power supply device shown in FIG. 1. In Embodiment 1, the quasi-resonant control unit 50 shown in FIG. 1 is replaced by a control unit 50a described in FIG. 5.

Figure 2:
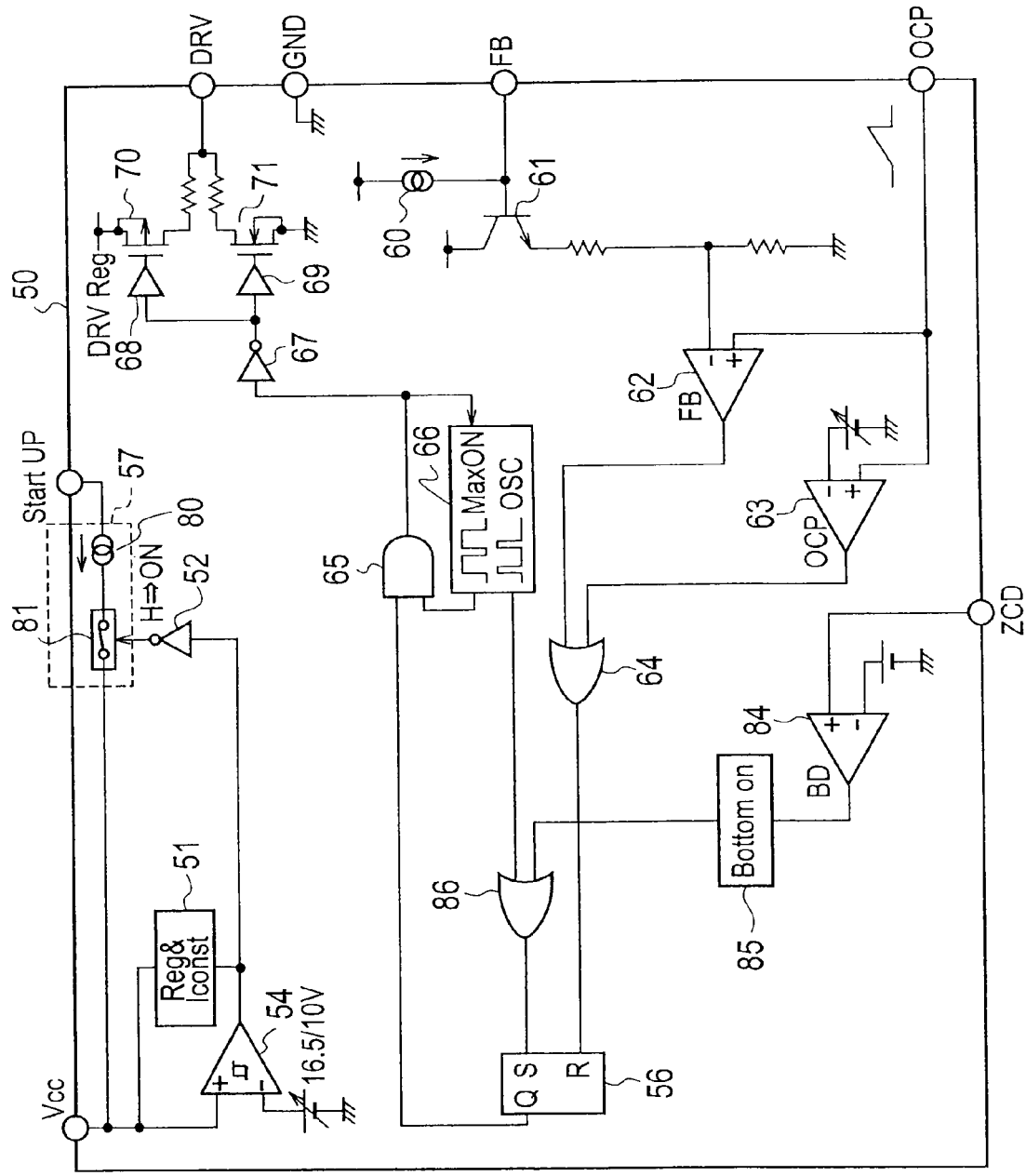
FIG. 2 is a circuit diagram showing a configuration of an inside of a control unit of the quasi-resonant switching power supply device shown in FIG. 1.
Figure 3:
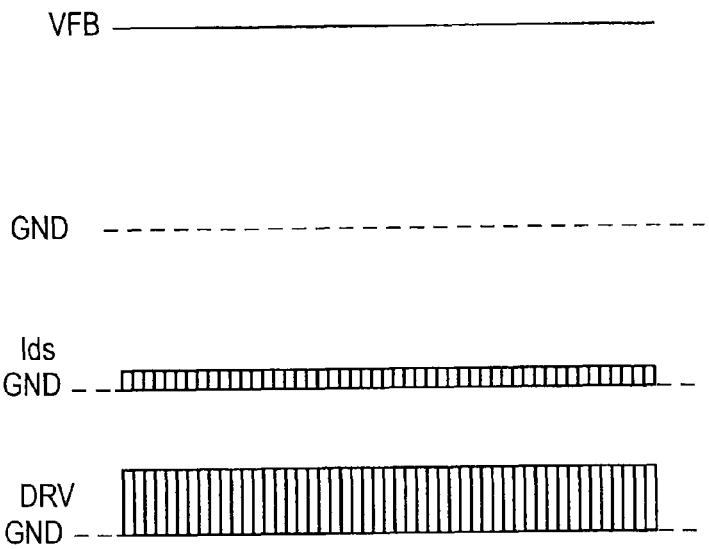
FIG. 3 is a waveform chart of the respective portions of the quasi-resonant switching power supply device shown in FIG. 1 when a load is light.
Figure 4:
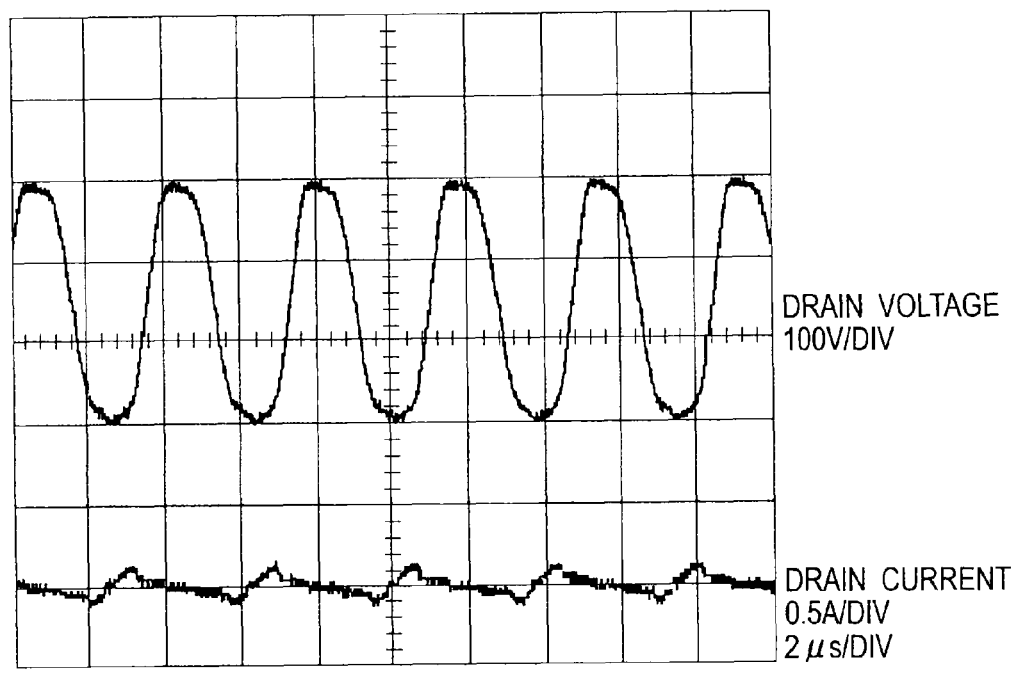
FIG. 4 is a waveform chart of a switching operation of the quasi-resonant switching power supply device shown in FIG. 1 when the load is none.

The control unit 50a as a control circuit of the switching power supply device according to Embodiment 1 of the present invention controls ON/OFF of the switching element 5. The switching power supply device according to Embodiment 1 includes: the transformer 4 that has the primary winding P, the secondary winding S and the auxiliary winding D; the switching element 5 connected to the primary winding P of the transformer 4; the control unit 50a that performs the ON/OFF control for the switching element 5 in the case where the voltage is inputted to the primary side of the transformer 4; the rectifying/smoothing circuit that rectifies and smoothes the voltage induced in the secondary winding S of the transformer 4 and outputs the voltage from the Vout terminal to the external load; and the auxiliary power supply circuit composed by connecting the diode 11 and the backup capacitor 12 to the auxiliary winding D. The auxiliary power supply circuit rectifies and smoothes a voltage induced in the auxiliary winding D of the transformer 4, and charges the backup capacitor 12 owned thereby to then supply the power to the Vcc terminal of the control unit 50a. Note that the same or equated ones as and to the constituent components in FIGS. 1 and 2 are denoted by the same reference numerals, which are the same as above, in FIG. 5 and the drawings showing the respective embodiments to be described later, and a duplicate description is omitted.

First, a description will be made of a configuration of Embodiment 1. The control unit 50a of the switching power supply device according to Embodiment 1 further includes a BST comparator 55, a second OCP comparator 63b, a pulse generator 72, a second flip-flop 87, a NOR circuit 88, and a second AND circuit 89 in addition to the configuration of the conventional control unit 50 in FIG. 2.

The BST comparator 55 is an intermittent control unit, and in the case where the external load is light, controls the switching element 5 to perform an intermittent oscillation operation based on a feedback signal corresponding to the output voltage to the load. Specifically, in the case where the voltage signal corresponding to the amount of the current flowing through the transistor 61 drops to the predetermined voltage value or less, the BST comparator 55 outputs a signal of the H level. When the load is light (or none), the capacitor 10 is discharged by the operations of the LED 9a and phototransistor 9b of the photocoupler, and accordingly, the feedback signal (FB terminal voltage) drops. Hence, the BST comparator 55 outputs a signal of the L level when the load is usual, but outputs the signal of the H level when the load is light.

The second OCP comparator 63b is a current control unit, and in the case where the load is light, controls the switching element 5 to prevent the current flowing therethrough from dropping to a fixed value or less. Specifically, the second OCP comparator 63b outputs a signal of the H level in the case where the voltage signal outputted from the OCP terminal exceeds a predetermined voltage value. Then, the signal of the H level, which is outputted from the second OCP comparator 63b, is inputted to an R terminal of the second flip-flop 87. The predetermined voltage value (threshold value) in the second OCP comparator 63b is, for example, preset at approximately 5% to 25% of a threshold value in a first OCP comparator 63a. This value is appropriately set, whereby the BST comparator 55 can operate smoothly when the load is light.

Note that the first OCP comparator 63a is similar to the conventional OCP comparator 63 described with reference to FIG. 2. Specifically, in the case where the voltage signal outputted from the OCP terminal exceeds the predetermined voltage value, the OCP comparator 63a determines that the amount of the current flowing through the switching element 5 is an overcurrent, and outputs a signal of the H level. Then, the signal of the H level, which is outputted from the first OCP comparator 63a, is inputted to the R terminal of the flip-flop 56 through the OR gate 64.

The OR gate 64 outputs a signal of the H level to the R terminal of the flip-flop 56 upon receiving such an H signal from at least one of the BST comparator 55, the second AND circuit 89 and the first OCP comparator 63a.

The pulse generator 72 outputs a pulse waveform signal for masking a surge current generated when the switching power supply device is turned on to the NOR circuit 88 and an S terminal of the flip-flop 87. In such a way, even if the FB comparator 62 outputs the signal of the H level owing to the surge current generated when the switching power supply device is turned on, the pulse generator 72 outputs a pulse signal to thereby prevent the switching element 5 from being turned off. Note that a signal width of the pulse signal outputted by the pulse generator 72 is the minimum ON width or less in the case where an AC input inputted to the main circuit is the highest. For example, the signal width is approximately 0.3 μs to 1.5 μs.

The second flip-flop 87 outputs a control signal from a Q terminal thereof to the NOR circuit 88 based on the signal inputted to the S terminal thereof from the pulse generator 72 and on the signal inputted to the R terminal thereof from the second OCP comparator 63b.

The output of the pulse generator 72 and the output of the second flip-flop 87 are inputted to an input terminal of the NOR circuit 88. Specifically, in the case where a signal of the H level is outputted by the pulse generator 72, or in the case where a signal of the H level is outputted by the second flip-flop 87, the NOR circuit 88 outputs a signal of the L level to the second AND circuit 89.

Only in the case where both of the output of the FB comparator 62 and the output of the NOR circuit 88 are signals of the H level, the second AND circuit 89 outputs a signal of the H level through the OR gate 64 to the R terminal of the flip-flop 56, and turns off the switching element 5.

Figure 6:
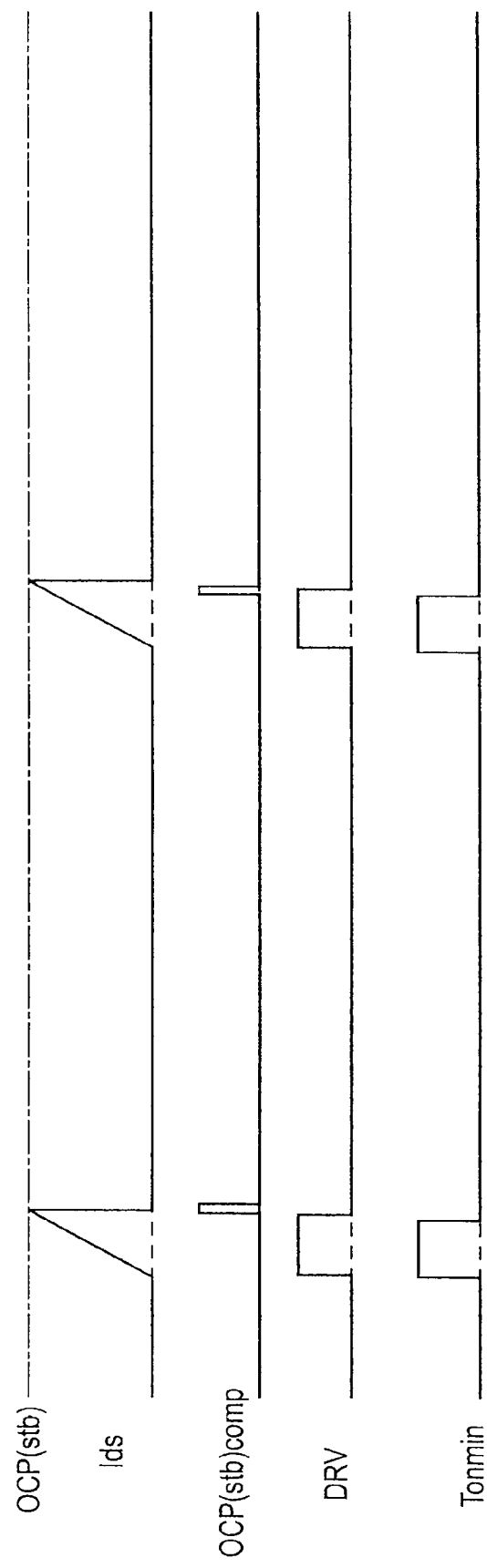
FIG. 6 is a waveform chart showing an operation principle of the switching power supply device according to Embodiment 1 of the present invention.

Next, a description will be made of functions of Embodiment 1 configured as described above. FIG. 6 is a waveform chart showing an operation principle of the switching power supply device according to Embodiment 1. Note that, in FIG. 6, an output voltage of the alternating current power supply 1 is assumed to be AC 200V.

First, a sinusoidal voltage outputted by the alternating current power supply 1 is rectified by the bridge rectifier 2, passes through the capacitor 3, and is inputted to the Drain terminal of the switching element 5 through the primary winding P of the transformer 4. Meanwhile, since the switch 81 is turned on, the starting circuit 57 supplies a current to the backup capacitor 12 and charges the backup capacitor 12 by the constant current source 80 until the voltage of the Vcc terminal exceeds 16.5 V. When the voltage of the Vcc terminal exceeds 16.5 V, then the internal power supply 51 starts to operate and starts to supply the power to the control unit 50a. Then, the starting circuit 57 turns off the switch 81, and stops supplying the starting current.

When the voltage of the Vcc terminal exceeds 16.5 V, and the control unit 50a starts to operate, then the switching element 5 starts the switching operation. Therefore, the energy starts to be supplied to the respective windings of the transformer 4, and the currents flow through the secondary winding S and the auxiliary winding D.

The alternating current flowing through the secondary winding S is rectified and smoothed by the rectifying/smoothing circuit composed of the rectifying diode 6 and the output capacitor 7, and thereby becomes a direct current. Then, this direct current is outputted from the Vout terminal to the external load.

When the load is usual, the switching element 5 operates in a continuous oscillation operation. An output voltage stabilizing operation at this time, which is performed by the feedback using the error amplifier 8 and the LED 9a and phototransistor 9b of the photocoupler, is similar to that of the related art described with reference to FIGS. 1 and 2, and a duplicate description is omitted.

Next, a description will be made of operations of the switching power supply device according to Embodiment 1 when the load is light (or none). As the load connected to the Vout terminal is becoming gradually lighter, the current flowing through the LED 9a of the photocoupler is increased in response to the error of the Vout voltage with respect to the reference voltage set in the error amplifier 8. Then, the current flowing through the phototransistor 9b of the photocoupler is increased. As a result, the capacitor 10 is discharged, and the voltage of the FB terminal drops. In such a way, the voltage inputted to a negative side of the FB comparator 62 drops. Then, as mentioned above, the switching frequency of the switching element 5 rises, and the current value of the current Ids flowing through the switching element 5 is lowered. However, regardless of the output made by the FB comparator 62, the second OCP comparator 63b prevents the switching element 5 from being turned off until the drain current Ids reaches a predetermined value (value of OCP(stb) shown by an alternate long and short dashed line in FIG. 6). In such a way, the drain current Ids is not lowered to a predetermined current value or less.

Note that OCP(stb)comp shown in FIG. 6 shows an output waveform of the second OCP comparator 63b. When the drain current Ids reaches the predetermined value, the second OCP comparator 63b outputs the signal of the H level, and permits the switching element 5 to be turned off. However, as a result of that the switching element 5 is turned off, the value of the drain current Ids becomes zero. Therefore, the second OCP comparator 63b thereafter outputs the signal of the L level again.

Moreover, Tonmin shown in FIG. 6 is the pulse waveform outputted by the pulse generator 72. While Tonmin is at the H level, the switching element 5 is not turned off regardless of the output of the FB comparator 62. Hence, even if the drain current Ids indicates a spike current waveform (not shown) at a rising time thereof, the pulse generator 72 masks the current concerned, and prevents the switching element 5 from being turned off.

Furthermore, DRV also shown in FIG. 6 indicates a voltage waveform of the DRV terminal of the control unit 50a. In the case where DRV is at the H level, the switching element 5 is turned on.

Figure 7:
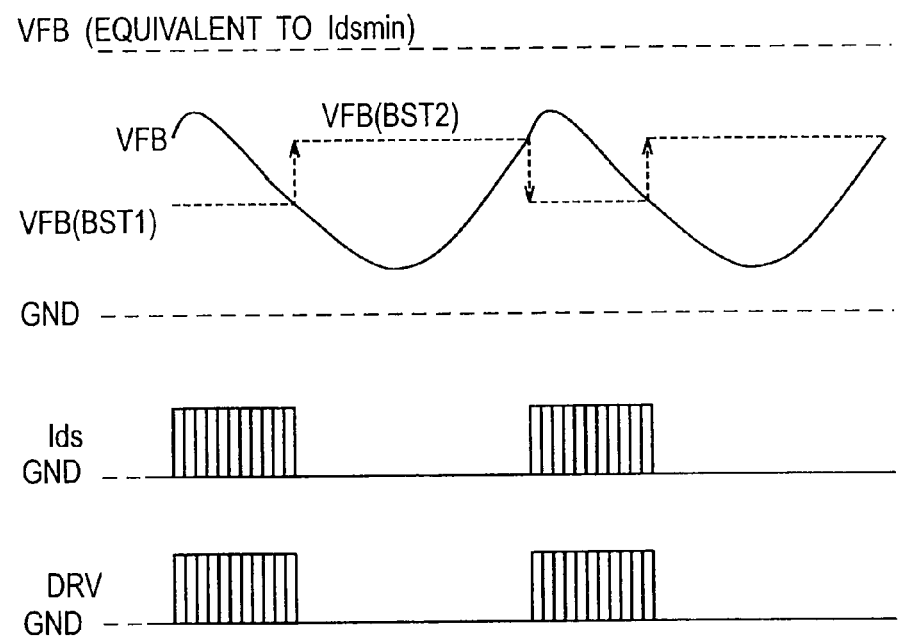
FIG. 7 is a waveform chart of the respective portions of the switching power supply device according to Embodiment 1 of the present invention when a load is light.

FIG. 7 is a waveform chart of the respective portions of the switching power supply device according to Embodiment 1 when the load is light. As described with reference to FIG. 6, the drain current Ids is not lowered to the predetermined current value or less even when the load is light. As a result, the output to the load by the switching power supply device according to Embodiment 1 is increased. Therefore, the voltage of the FB terminal (VFB) drops sharply as shown in FIG. 7. In such a way, the BST comparator 55 in the control unit 50a outputs the signal of the H level. Then, when this signal of the H level is inputted to the R terminal of the flip-flop 56, the flip-flop 56 is reset. As a result, the oscillation of the switching element 5 is stopped. Note that, in FIG. 7, it is assumed that the BST comparator 55 is a hysteresis comparator, and has two reference voltage values (VFB(BST1) and VFB(BST2)). However, a usual comparator that has one reference voltage value may be used.

Here, a broken line indicated for "VFB (equivalent to Idsmin)" in FIG. 7 is a voltage value of the FB terminal at the time when the drain current Ids reaches the minimum current value set in the second OCP comparator 63b. In the case where the load is lighter, the output to the load rises and the voltage of the FB terminal further drops instead of that the drain current Ids is lowered as mentioned above. Hence, it is necessary that the reference voltage values of the BST comparator 55 (VFB(BST1) and VFB(BST2)) are set lower than "VFB (equivalent to Idsmin)", and that adjustment is performed so that the BST comparator 55 can operate only when the load is light, in which the intermittent operation is required. Moreover, the reference voltage values (VFB(BST1) and VFB(BST2)) mentioned herein are values corresponding to a voltage inputted to a positive side of the BST comparator 55; however, are not the same in a strict sense, and are considered as reference values to the voltage value of the FB terminal. Comparison between VFB as the FB terminal voltage and the reference voltage values (VFB(BST1) and VFB(BST2)) is performed by the BST comparator 55. However, the BST comparator 55 does not directly confirm the voltage of the FB terminal, and in actual, the comparison is performed by using the voltages inputted to the positive and negative sides of the BST comparator 55 itself.

Thereafter, an output voltage of the secondary-side circuit drops, and the feedback signal rises. Then, the BST comparator 55 outputs the signal of the L level, and resumes the oscillation of the switching element 5. Thereafter, the switching power supply device according to Embodiment 1 repeats the above-mentioned operations when the load is light.

A point of Embodiment 1 of the present invention is in that the switching power supply device includes the current control unit (second OCP comparator 63b) that prevents the drain current from being lowered to the fixed value or less, and the intermittent control unit (BST comparator 55) that performs the intermittent oscillation operation. In the conventional quasi-resonant switching power supply device, the switching frequency rises without limit also in the case where the load becomes light. Therefore, there has been no abrupt change of the feedback signal, and the conventional quasi-resonant switching power supply device has difficulty performing the intermittent oscillation operation. However, the switching power supply device according to Embodiment 1 includes the current control unit and the intermittent control unit, thereby prevents the drain current Ids from being lowered to the set current value or less, and sharply changes the feedback signal by the output rise following this prevention, thus enabling the intermittent oscillation operation when the load is light.

Figure 8:
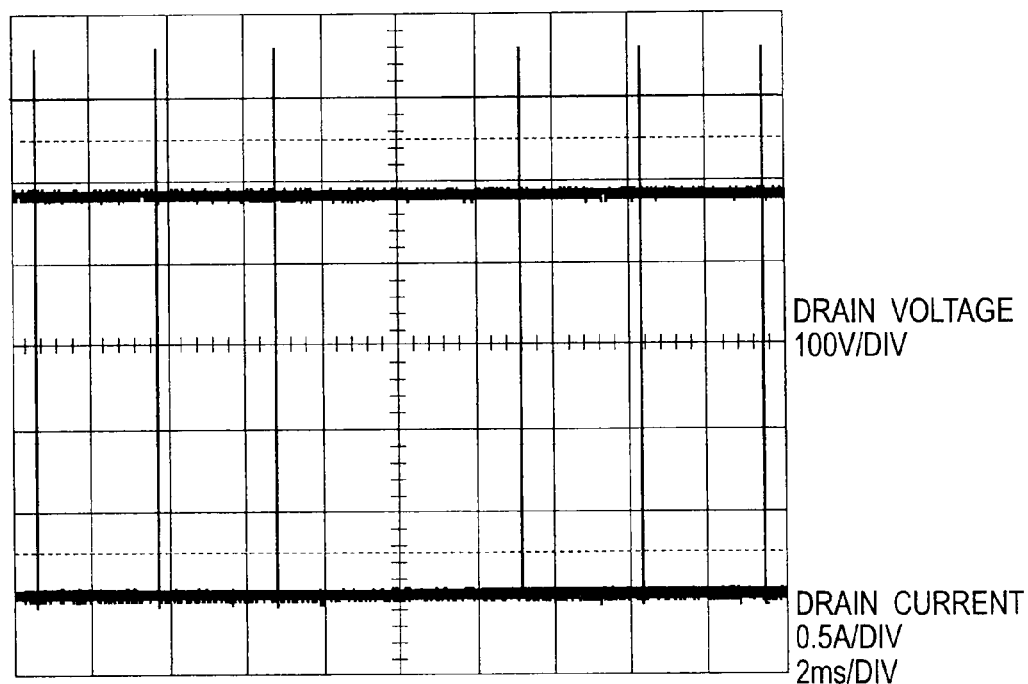
FIG. 8 is a chart showing an intermittent operation waveform of a switching element of the switching power supply device according to Embodiment 1 of the present invention when the load is light.
Figure 9:
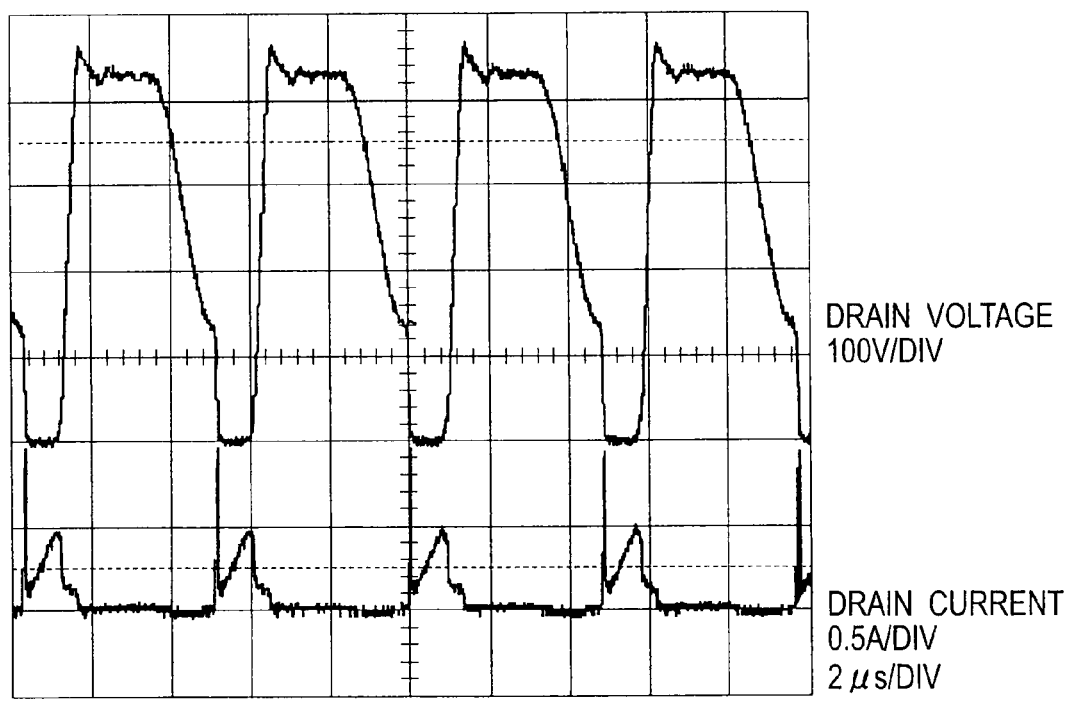
FIG. 9 is a chart showing an operation waveform of the switching element of the switching power supply device according to Embodiment 1 of the present invention when the load is light.

FIG. 8 is a chart showing an intermittent operation waveform of the switching element 5 of the switching power supply device according to Embodiment 1 when the load is light. Moreover, FIG. 9 is a chart showing an operation waveform of the switching element 5 of the switching power supply device according to Embodiment 1 when the load is light. As shown in FIG. 9, the drain current flowing through the switching element 5 generates the surge current at the rising time thereof. However, as mentioned above, the pulse generator 72 outputs the pulse signal to thereby mask the surge current, and avoids the switching element 5 being turned off at an inappropriate time. Note that, in FIGS. 8 and 9, the output voltage of the alternating current power supply 1 is assumed to be AC 200V.

Figure 10:
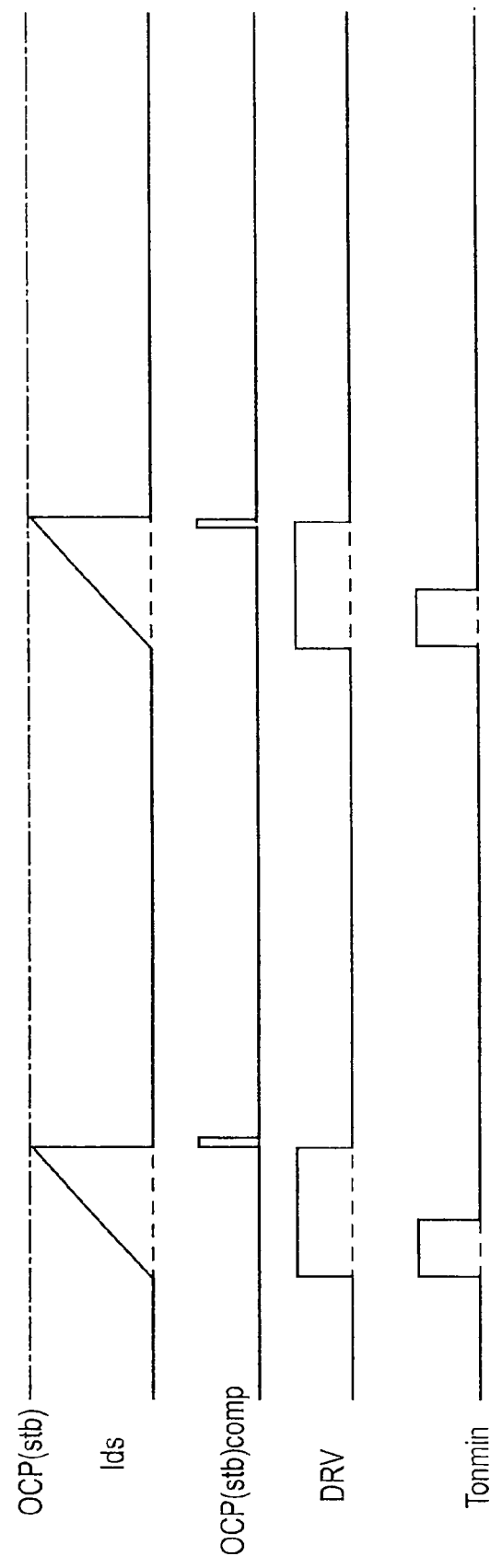
FIG. 10 is a waveform chart showing the operation principle of the switching power supply device according to Embodiment 1 of the present invention.

FIG. 10 is a waveform chart showing the operation principle of the switching power supply device according to Embodiment 1. A different point of FIG. 10 from FIG. 6 is that the output voltage of the alternating current power supply 1 is AC 100V. In the case where the output voltage of the alternating current power supply 1 is AC 100V, it takes time for the drain current Ids of the switching element 5 to raise the value thereof in comparison with the case where the output voltage concerned is AC 200 V as shown in FIGS. 6 and 10. However, the second OCP comparator 63b avoids the switching element 5 being turned off until the drain current Ids reaches the predetermined value (value of OCP(stb) shown by an alternate long and short dashed line in FIG. 10). Hence, the control unit 50a turns on the switching element 5 (sets DRV at the H level) for a long period in comparison with the case where the output voltage is AC 200V, and avoids the drain current Ids being lowered to the predetermined current value or less. Moreover, the control unit 50a performs a control to flow, through the switching element 5, a current of the minimum current value set by the second OCP comparator 63b or more. Therefore, regardless of a magnitude of the AC input, the intermittent operation when the load is light can be surely achieved. Moreover, a load range for which the intermittent operation is performed (boundary at which the continuous oscillation/intermittent operation are switched) is decided by a load factor, which is set by the reference voltage of OCP(stb) (≈ratio of the output voltage with respect to the reference voltage inputted to one terminal of OCP), without being affected by a difference in turns ratio of a flyback transformer, either.

Figure 11:
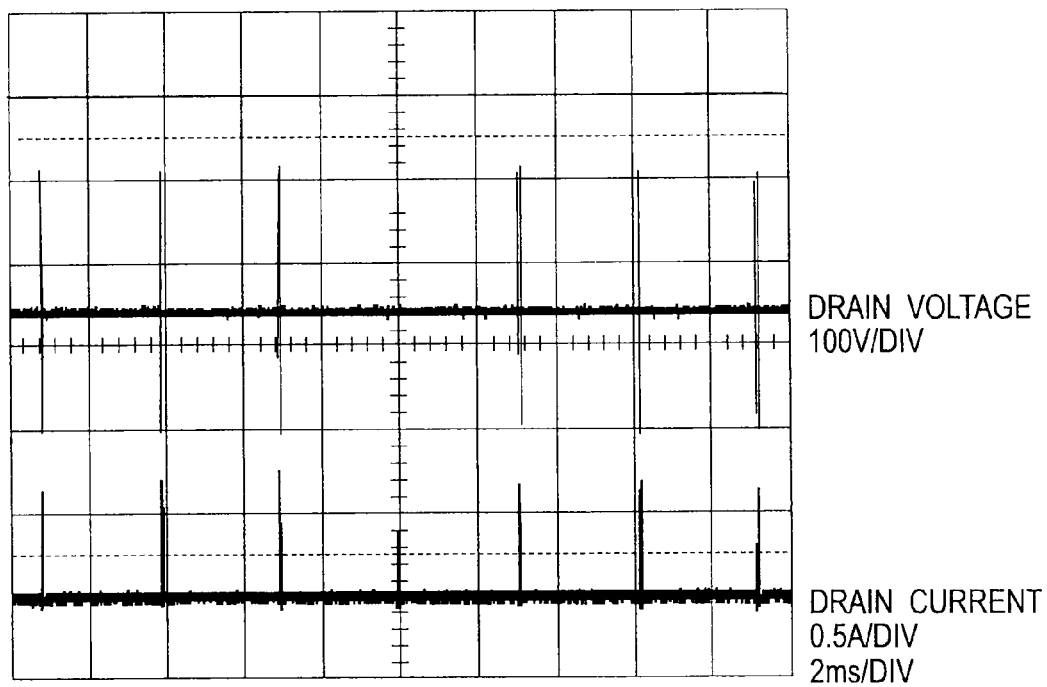
FIG. 11 is a chart showing an intermittent operation waveform of the switching element of the switching power supply device according to Embodiment 1 of the present invention when the load is light.
Figure 12:
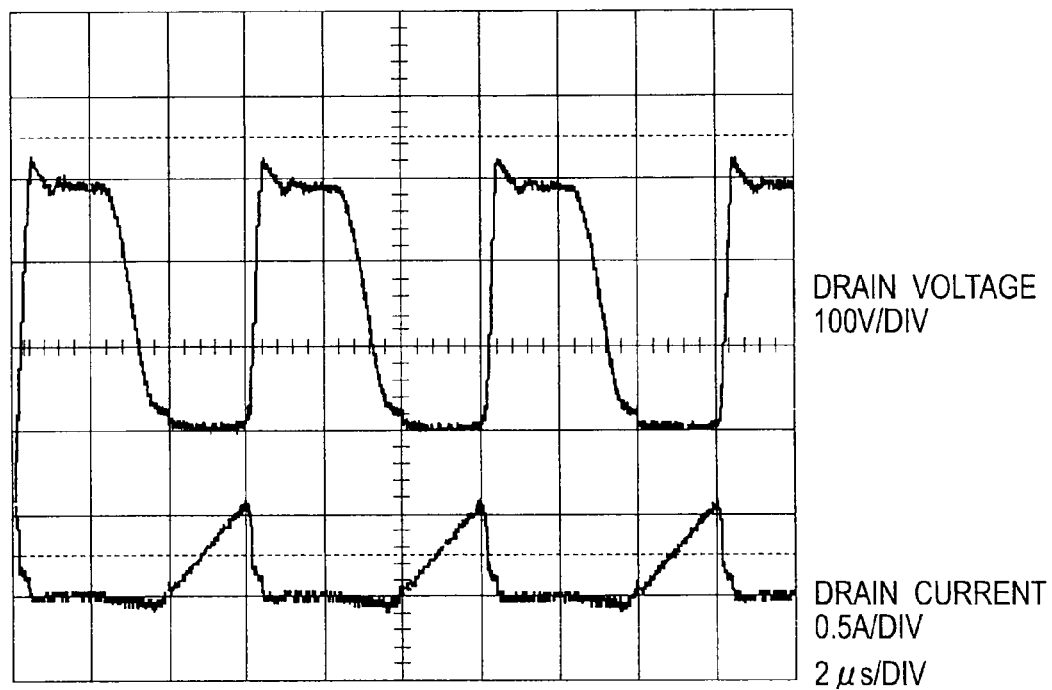
FIG. 12 is a chart showing an operation waveform of the switching element of the switching power supply device according to Embodiment 1 of the present invention when the load is light.

FIG. 11 is a chart showing an intermittent operation waveform of the switching element 5 of the switching power supply device according to Embodiment 1 when the load is light. Moreover, FIG. 12 is a chart showing an operation waveform of the switching element 5 of the switching power supply device according to Embodiment 1 when the load is light. Note that, in FIGS. 11 and 12, the output voltage of the alternating current power supply 1 is assumed to be AC 100V.

As mentioned above, in accordance with the switching power supply device according to Embodiment 1, a highly efficient switching power supply device can be realized, which, at the time of the standby operation when the load becomes light, performs the intermittent oscillation operation without raising the oscillation frequency without limit, and reduces a switching loss when the load is light by means of a simple configuration.

Specifically, in accordance with the switching power supply device according to Embodiment 1, the highly efficient intermittent oscillation operation that is based on whether the load is heavy or light and has been difficult in the conventional quasi-resonant switching power supply device can be performed. Then, the number of switching times can be reduced, and the switching loss when the load is light can be reduced. Moreover, in accordance with the switching power supply device according to Embodiment 1, the pulse counter circuit and the timer circuit, which are provided in the switching power supply control circuit described in Patent Literature 1, are not required, and a switching power supply device that is compact and low cost can be realized by means of the simple configuration.

Moreover, the switching power supply device according to Embodiment 1 restricts the minimum ON width of such a gate drive voltage (DRV) by the drain current value of the switching element 5, and thereby can surely achieve the intermittent operation when the load is light. Furthermore, regardless of the magnitude of the AC input voltage, the switching power supply device according to Embodiment 1 can stably achieve the intermittent operation in the standby state (when the load is light).

Embodiment 2

Figure 13:
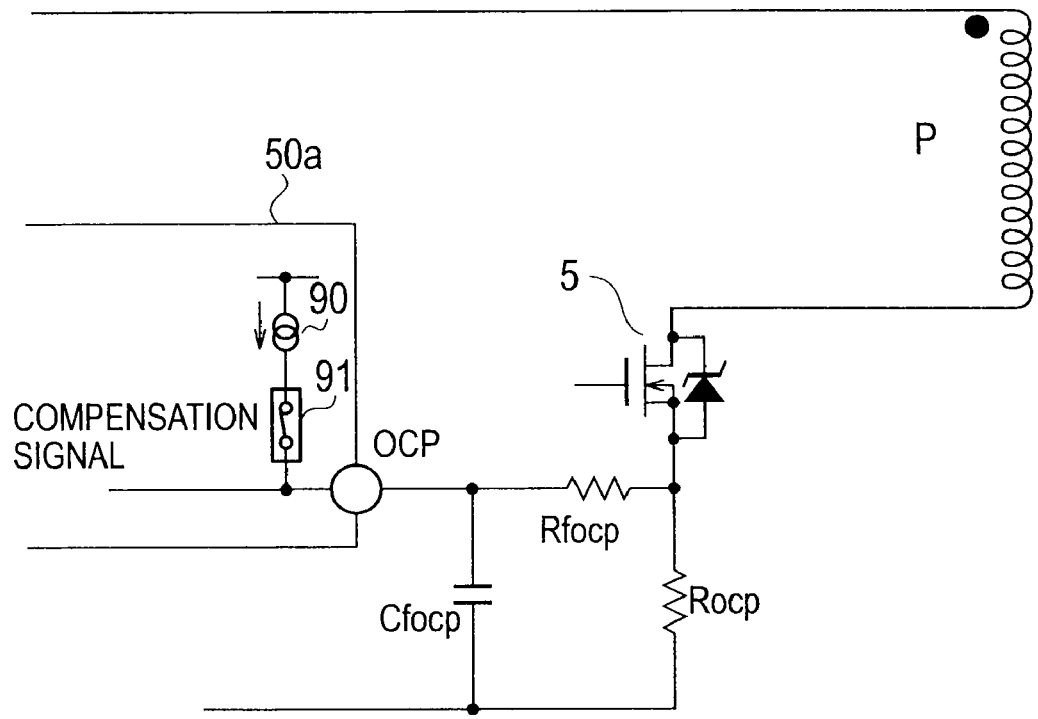
FIG. 13 is a diagram showing a configuration of a switching power supply device according to Embodiment 2 of the present invention.

FIG. 13 is a diagram showing a configuration of a switching power supply device according to Embodiment 2 of the present invention. Note that an entire configuration of the switching power supply device according to Embodiment 2 is substantially similar to that of the switching power supply device according to Embodiment 1. The switching power supply device according to Embodiment 2 is different from the switching power supply device according to Embodiment 1 in that a constant current source 90 and a second switch 91, which are for supplying a compensation constant current, are provided in the control unit 50a, and that a detecting resistor Rocp, an adjusting resistor Rfocp and a noise removing capacitor Cfocp are provided on an outside of the control unit 50a.

The constant current source 90 supplies the constant current to the OCP terminal in the case where the second switch 91 is turned on. Moreover, the second switch 91 turns on during a period since DRV is turned on until the second OCP comparator 63b outputs the signal of the H level, and thereby biases a predetermined current to the OCP terminal during the period concerned.

In Embodiment 2, the second OCP comparator 63b, the constant current source 90 and the second switch 91 compose a current control unit, bias a predetermined current to the current value flowing through the switching element 5, and control the switching element 5 to prevent the biased current value from being lowered to a fixed value or less. Specifically, in the case where a voltage signal outputted from the biased OCP terminal exceeds a predetermined voltage value, the second OCP comparator 63b outputs a signal of the H level. Then, the signal of the H level is inputted to the R terminal of the flip-flop 87.

Other configurations are similar to those of Embodiment 1, and a duplicate description will be omitted.

Figure 14:
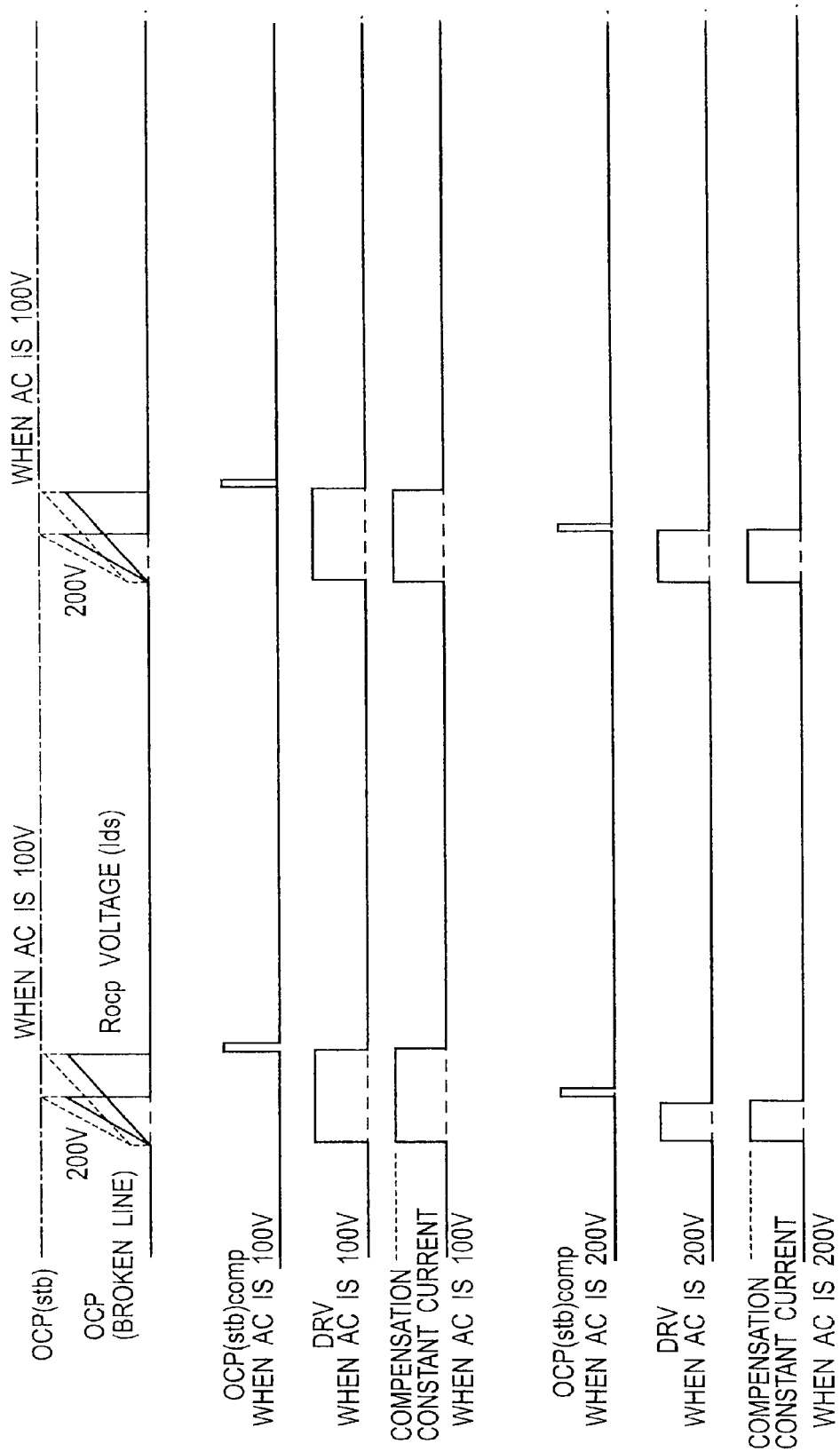
FIG. 14 is a waveform chart showing operations of the respective portions of the switching power supply device according to Embodiment 2 of the present invention.

Next, a description will be made of functions of Embodiment 2 configured as described above. FIG. 14 is a waveform chart showing operations of the respective portions of the switching power supply device according to Embodiment 2. When the voltage of Vcc exceeds 16.5 V, the control unit 50a starts to operate, and stabilization of the output voltage of the secondary-side circuit is achieved by the feedback. This operation is similar to that of Embodiment 1, and a duplicate description will be omitted.

Next, a description will be made of operations of the switching power supply device according to embodiment 2 when the load is light (or none). As the load connected to the Vout terminal is becoming gradually lighter, the current flowing through the LED 9a of the photocoupler is increased in response to the error of the Vout voltage with respect to the reference voltage set in the error amplifier 8. Then, the current flowing through the phototransistor 9b of the photocoupler is increased. Therefore, the capacitor 10 is discharged, and the voltage of the FB terminal drops.

In such a way, the voltage inputted to the negative side of the FB comparator 62 drops, and accordingly, the switching frequency of the switching element 5 rises as mentioned above. As a result, the current Ids flowing through the switching element 5 is lowered. Here, the drain current Ids flowing through the switching element 5 (or voltage applied to the detecting resistor Rocp) indicates a waveform shown by a solid line on the uppermost stage in FIG. 14, and does not reach a predetermined value (value of OCP(stb) shown by an alternate long and short dashed line on the uppermost stage in FIG. 14). However, a predetermined current (compensation constant current shown in FIG. 14) supplied by the constant current source 90 and the second switch 91 is biased to the OCP terminal during the period since DRV is turned on until the second OCP comparator 63b outputs the signal of the H level. This compensation constant current flows through the adjusting resistor Rfocp, and accordingly, the voltage of the OCP terminal rises in comparison with the case where the compensation constant current is not flown. As a result, the second OCP comparator 63b prevents the switching element 5 from being turned off until the biased current value (broken-line waveform on the uppermost stage in FIG. 14) reaches the predetermined value (value of OCP(stb) shown by the alternate long and short dashed line on the uppermost stage in FIG. 14).

Specifically, the constant current source 90 and the second switch 91, which are provided in the control unit 50a, supply the compensation constant current to the OCP terminal, whereby the switching power supply device according to Embodiment 2 controls a lower limit value of the drain current Ids flowing through the switching element 5.

Note that OCP(stb)comp shown in FIG. 14 indicates an output waveform of the second OCP comparator 63b in a similar way to FIG. 6. In the case where a value obtained by biasing the predetermined current to the drain current Ids reaches a predetermined value, the second OCP comparator 63b outputs the signal of the H level, and permits the switching element 5 to be turned off. Then, as a result of that the switching element 5 is turned off, the value of the drain current Ids becomes zero. Therefore, the second OCP comparator 63b thereafter outputs a signal of the L level. Moreover, as shown in FIG. 14, regardless of the magnitude of the voltage inputted from the alternating current power supply 1 (no matter whether the inputted voltage may be AC 100 V or AC 200 V), the drain current Ids flowing through the switching element 5 is not lowered to the fixed current value or less.

Other functions are similar to those of the related art and Embodiment 1, and a duplicate description will be omitted.

As mentioned above, in accordance with the switching power supply device according to Embodiment 2 of the present invention, in addition to the effects of Embodiment 1, the constant current source 90 and the second switch 91, which are provided in the control unit 50a, supply the compensation constant current to the OCP terminal. As a result, the lower limit value of the drain current Ids flowing through the switching element 5 is controlled. In such a way, the switching power supply device according to Embodiment 2 can adjust the load range by the intermittent oscillation. In particular, even when the control unit 50a is formed into an IC, a user changes a resistance value of the adjusting resistor Rfocp, and thereby can freely set the load range for which the intermittent oscillation operation is performed.

Moreover, at the time when the second OCP comparator 63b outputs the signal of the H level, the second switch 91 is turned off, and stops the supply of the compensation constant current to the OCP terminal. As a result, the compensation constant current does not flow at the time when the drain current Ids reaches the threshold value of the first OCP comparator 63a. Hence, the compensation constant current by the constant current source 90 and the second switch 91 does not affect the overcurrent detection made by the first OCP comparator 63a.

Note that the second switch 91 just needs to be turned off at the time when the second OCP comparator 63b outputs the signal of the H level, and the second switch 91 may be turned on during the period while the second OCP comparator 63b is outputting the signal of the L level.

Embodiment 3

Figure 15:
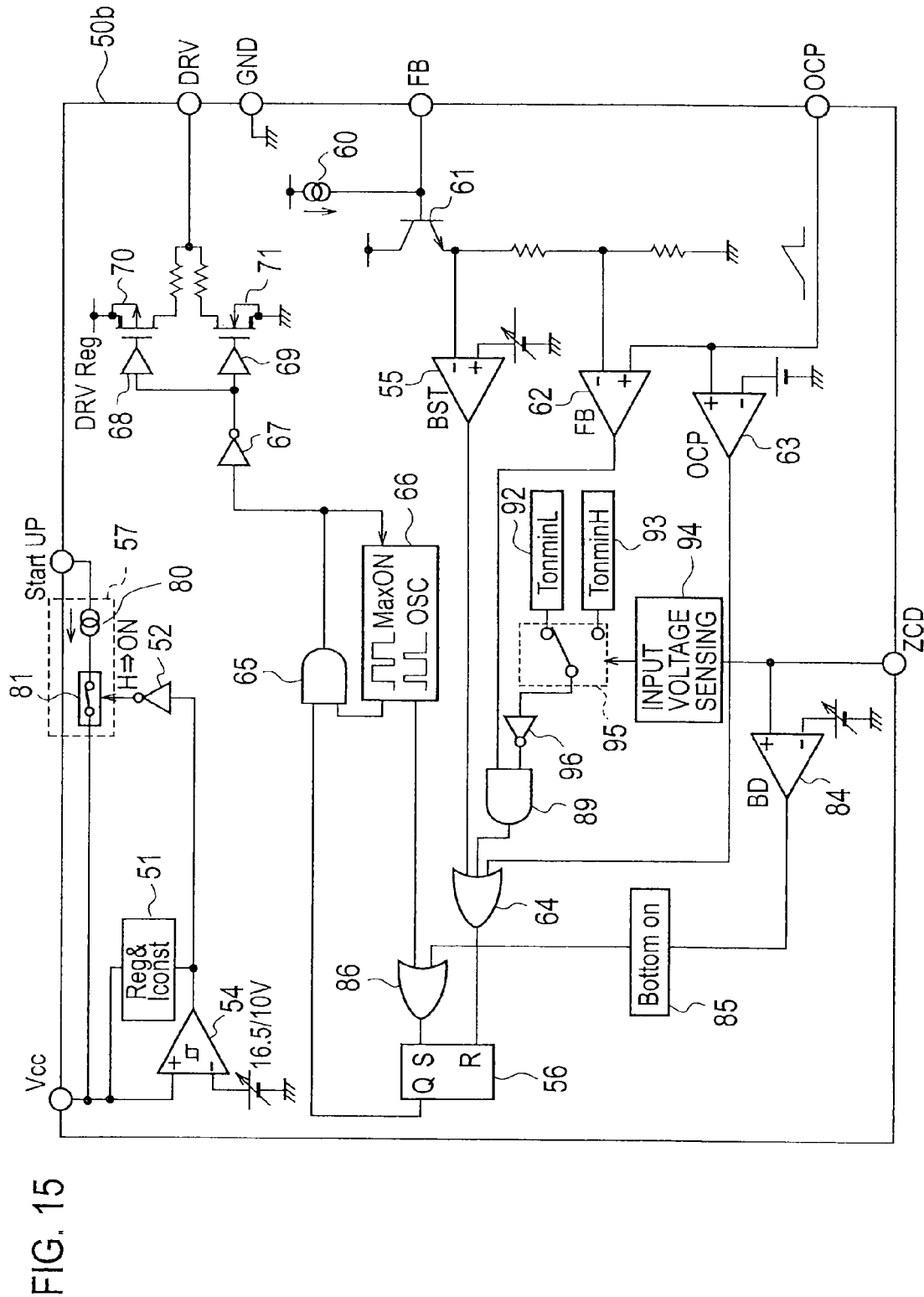
FIG. 15 is a circuit diagram showing a configuration of a control unit of a switching power supply device according to Embodiment 3 of the present invention.

FIG. 15 is a circuit diagram showing a configuration of a control unit 50b of a switching power supply device according to Embodiment 3 of the present invention. Note that an entire configuration of the switching power supply device according to Embodiment 3 is substantially similar to that of Embodiment 1 or that of the conventional switching power supply device described by using FIG. 1. In Embodiment 3, the control unit 50a in Embodiment 1 is replaced by a control unit 50b to be described with reference to FIG. 15. The control unit 50b in Embodiment 3 is different from the control unit 50a of the switching power supply device according to Embodiment 1 in that the control unit 50b does not have the pulse generator 72, the second OCP comparator 63b, the second flip-flop 87 or the NOR circuit 88, and instead of these, includes therein a first pulse generator 92, a second pulse generator 93, a voltage sensor 94, a third switch 95, and a third inverter 96.

The first pulse generator 92, the second pulse generator 93 and the voltage sensor 94 compose a current control unit, set the minimum ON time in response to the voltage inputted to the primary winding of the transformer 4, and control the switching element 5 to prevent the ON time of the switching element 5 from becoming shorter than the minimum ON time. This current control unit sets the minimum ON time to be long in the case where the voltage inputted to the primary winding of the transformer 4 is a predetermined value or less, and sets the minimum ON time to be short in the case where the voltage inputted to the primary winding of the transformer 4 exceeds the predetermined value.

Specifically, the first pulse generator 92 and the second pulse generator 93 are in charge of masking the surge current generated when the switching power supply device is turned on, and output pulse waveform signals having the same width as that of the minimum ON time of the switching element 5 to the third switch 95. In such a way, the first pulse generator 92 and the second pulse generator 93 avoid the FB comparator 62 turning off the switching element 5 by outputting the signal of the H level owing to the surge current generated when the switching power supply device is turned on. Moreover, the first pulse generator 92 and the second pulse generator 93 prevent the ON time of the switching element 5 from becoming shorter than the minimum ON time. Note that, in order to operate the BST comparator 55 for the intermittent oscillation when the load is light, signal widths (minimum ON time) of the pulse signals outputted by the first pulse generator 92 and the second pulse generator 93 are set, for example, at approximately 0.5 µs to 2 µs.

The signal width (TonminL) of the pulse signal generated by the first pulse generator 92 is set longer than the signal width (TonminH) of the pulse signal generated by the second pulse generator 93 (TonminH<TonminL). This is because the pulse signal generated by the first pulse generator 92 is a signal corresponding to the minimum ON time of the case where the AC input is low, and because the pulse signal generated by the second pulse generator 93 is a signal corresponding to the minimum ON time of the case where the AC input is high. As already described in comparison between the case of AC 100 V and the case of AC 200V, in the case where the AC input is low, it takes time to raise the drain current. Hence, in order to ensure the drain current of a fixed value or more, the minimum ON time is required to be a longer value.

The voltage sensor 94 senses the magnitude of the AC input voltage based on the voltage inputted to the ZCD terminal. Moreover, the third switch 95 selects either the first pulse generator 92 or the second pulse generator 93 based on a sensing result made by the voltage sensor 94, and transmits the pulse waveform signal, which is outputted from the selected pulse generator, to the third inverter 96. For example, in the case where the sensing result of the voltage sensor 94 tells that the AC input is 150 V or less, the third switch 95 selects the first pulse generator 92, and sets the minimum ON time to be long, and in the case where the AC input exceeds 150V, the third switch 95 selects the second pulse generator 93, and sets the minimum ON time to be short. In such a manner, the current control unit sets the minimum ON time in response to the voltage inputted to the primary winding of the transformer 4.

The third inverter 96 inverts the pulse signal inputted thereto through the third switch 95, and outputs the inverted pulse signal to the second AND circuit 89. Hence, during a period while the pulse signal of the H level is being outputted from the third switch 95 to the third inverter 96, the second AND circuit 89 does not output the signal of the H level even if the signal of the H level is inputted thereto from the FB comparator 62. Therefore, the switching element 5 is avoided being turned off.

Figure 16:
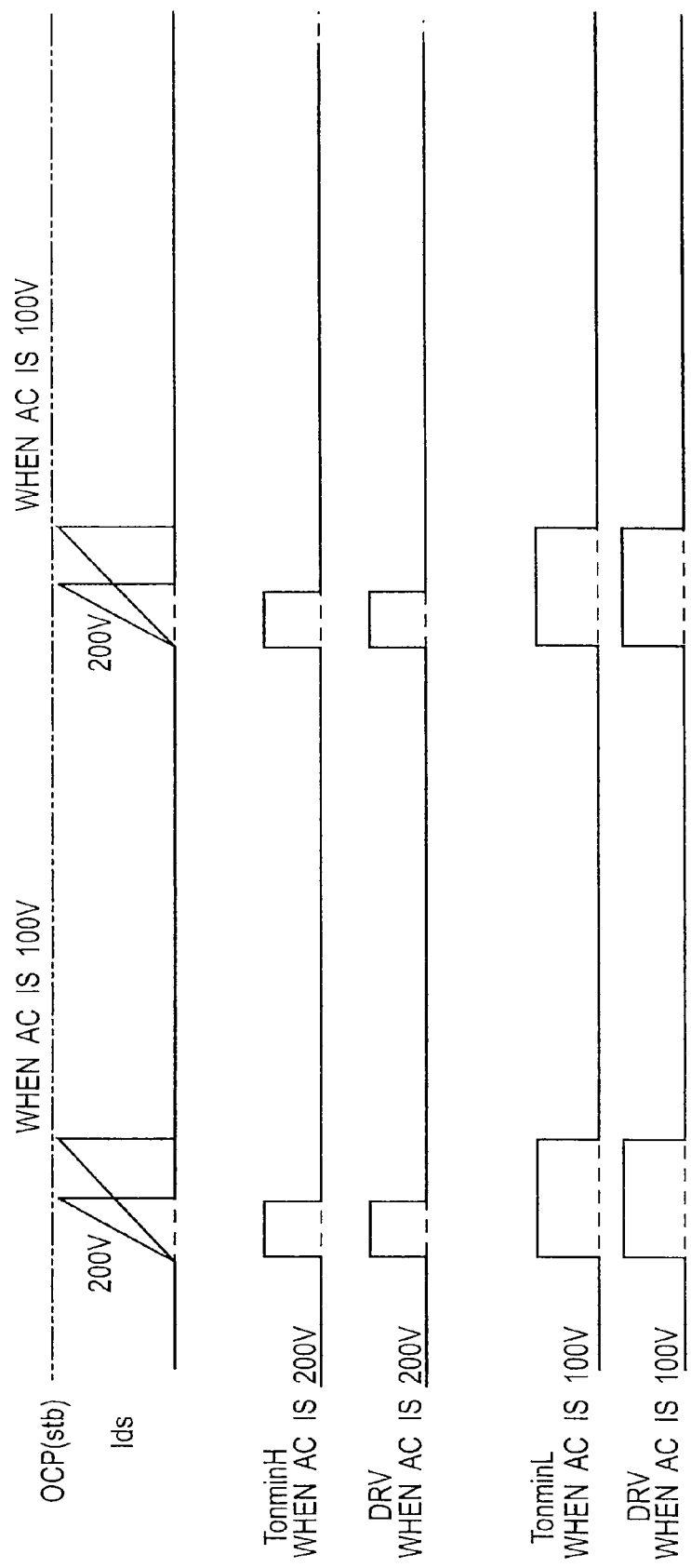
FIG. 16 is a waveform chart showing an operation principle of the switching power supply device according to Embodiment 3 of the present invention.

Next, a description will be made of functions of Embodiment 3 configured as described above. FIG. 16 is a waveform chart showing an operation principle of the switching power supply device of Embodiment 3. When the voltage of the Vcc terminal exceeds 16.5 V, the control unit 50b starts to operate, and stabilization of the output voltage of the secondary-side circuit is achieved by the feedback. This operation is similar to that of Embodiment 1, and a duplicate description will be omitted.

Next, a description will be made of operations of the switching power supply device according to Embodiment 3 when the load is light (or none). As the load connected to the Vout terminal is becoming gradually lighter, the current flowing through the LED 9a of the photocoupler is increased in response to the error of the Vout voltage with respect to the reference voltage set in the error amplifier 8. Then, the current flowing through the phototransistor 9b of the photocoupler is increased. Therefore, the capacitor 10 is discharged, and the voltage of the FB terminal drops. In such a way, the voltage inputted to the negative side of the FB comparator 62 drops. Therefore, as mentioned above, the switching frequency of the switching element 5 rises, and the current value of the current Ids flowing through the switching element 5 is lowered. However, regardless of the output made by the FB comparator 62, the first pulse generator 92 (or the second pulse generator 93) outputs the pulse waveform signal, and thereby prevents the switching element 5 from being turned off until the minimum ON time elapses. At this time, the third switch 95 selects the pulse generator corresponding to the AC input based on the sensing result of the voltage sensor 94, sets the minimum ON time to be long in the case where the AC input is low, and sets the minimum ON time to be short in the case where the AC input is high. In such a way, the drain current Ids is not lowed to the predetermined current value (OCP(stb) shown in FIG. 16) or less.

TonminL shown in FIG. 16 is a pulse waveform outputted by the first pulse generator 92, and Tonmin H is a pulse waveform outputted by the second pulse generation unit 93. During a period while these pulse waveforms are being at the H level, the switching element 5 is not turned off (DRV is maintained at the H level) regardless of the magnitude of the output of the FB comparator 62.

As a result of that the drain current Ids of the switching element 5 is maintained at the predetermined current value or more also when the load is light, the output to the load is increased, and the voltage (VFB) of the FB terminal drops sharply. With such a configuration, the BST comparator 55 in the control unit 50b performs the intermittent oscillation operation, and this is similar to Embodiments 1 and 2. Thereafter, when the output voltage of the secondary-side circuit drops and the feedback signal rises, the BST comparator 55 outputs the signal of the L level, and resumes the oscillation of the switching element 5. Thereafter, the switching power supply device according to Embodiment 3 repeats the above-mentioned operations when the load is light.

As mentioned above, in accordance with the switching power supply device according to Embodiment 3 of the present invention, in addition to the effects of Embodiment 1, the intermittent operation can be stably performed in the standby state (when the load is light) regardless of the magnitude of the AC input voltage by switching the minimum ON width depending on the AC input voltage.

Moreover, embodiments of the switching power supply device according to the present invention are not limited to the above-mentioned embodiments, and a variety of alterations are further possible. With regard to the control method, the overcurrent protection (OCP) may be controlled in such a manner that a polarity of the signal to be detected therein is changed from positive to negative. The feedback (FB) control may be a feedback control to which a phototransistor current of the photocoupler is flown. In the above description, the present invention is applied to the quasi-resonant control method; however, can also be applied to a fixed-frequency PWM control method and the like, and to other converters such as a flyback converter and a DC/DC converter.

What is claimed is:

1. A switching power supply device, comprising:
   a transformer comprising a primary winding and a secondary winding;
   a switching element connected to the primary winding of the transformer;
   a control circuit that controls the switching element to be turned on/off in a case where a voltage is inputted to the primary winding of the transformer, and thereby induces a voltage in the secondary winding of the transformer; and
   a rectifying/smoothing circuit that rectifies and smoothes the voltage induced in the secondary winding of the transformer, and outputs the rectified and smoothed voltage to a load,
   wherein the control circuit includes:
   a current control unit that controls the switching element to prevent a current flowing through the switching element from being lowered to a fixed value or less in a case where the load is light; and
   an intermittent control unit that, in the case where the load is light, controls the switching element to perform an intermittent oscillation operation based on a feedback signal corresponding to an output voltage to the load.

2. The switching power supply device according to claim 1, wherein the current control unit sets a minimum ON time in response to the voltage inputted to the primary winding of the transformer, and controls the switching element to prevent an ON time of the switching element from becoming shorter than the minimum ON time.

3. The switching power supply device according to claim 2, wherein the current control unit sets the minimum ON time to be long in a case where the voltage inputted to the primary winding of the transformer is a predetermined value or less, and sets the minimum ON time to be short in a case where the voltage inputted to the primary winding of the transformer exceeds the predetermined value.

4. The switching power supply device according to any one of claims 1 to 3, wherein the current control unit biases a predetermined current to a value of the current flowing through the switching element, and controls the switching element to prevent a value of the biased current from being lowered to a fixed value or less.

* * * * *